April 15, 1930.  W. STORRIE  1,755,155
WINDSHIELD WIPER
Filed Aug. 31, 1928
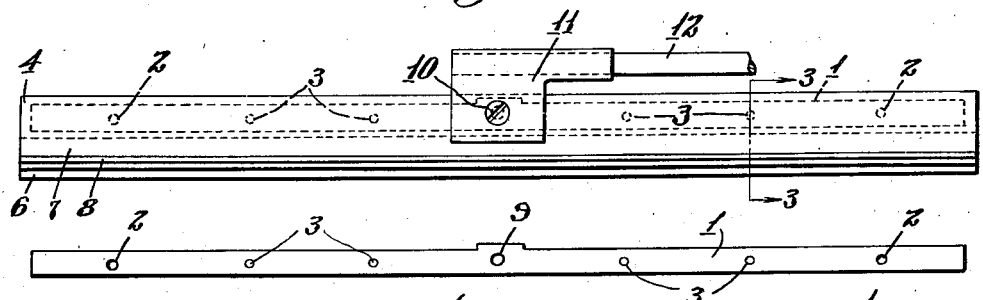
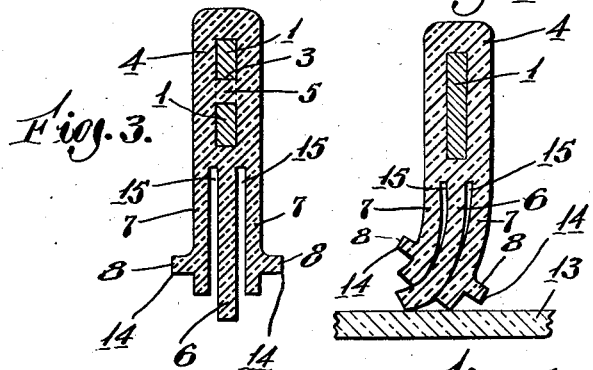
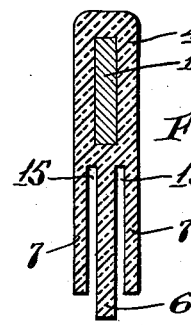
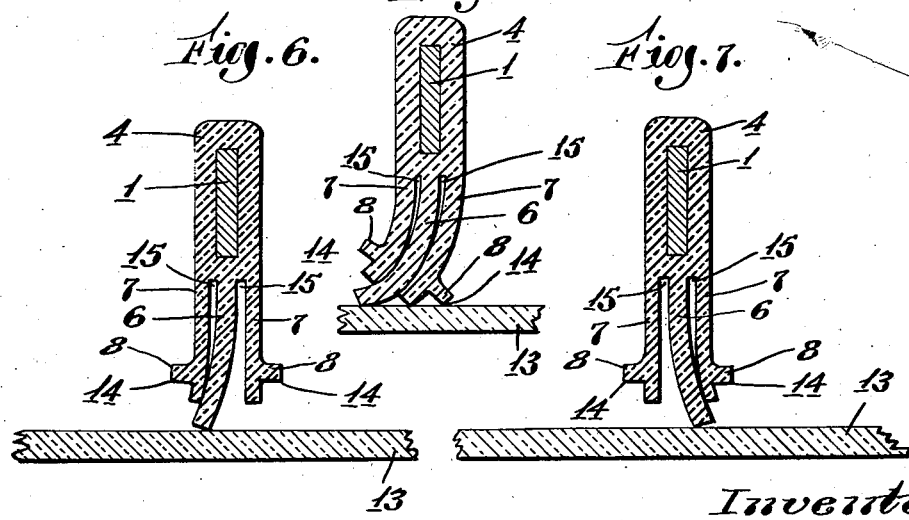
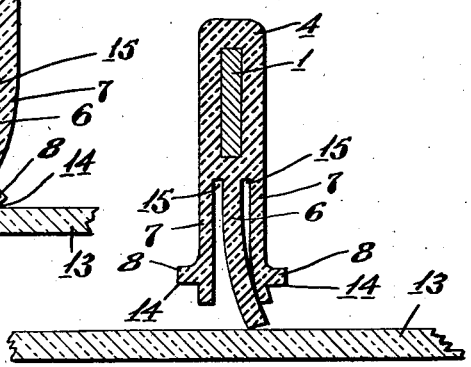
Inventor
William Storrie
by James R. Hodder
Attorney Patented Apr. 15, 1930

1,755,155

UNITED STATES PATENT OFFICE

WILLIAM STORRIE, OF PROVIDENCE, RHODE ISLAND, ASSIGNOR TO APCO MOSSBERG CORPORATION, OF ATTLEBORO, MASSACHUSETTS, A CORPORATION OF MASSACHUSETTS

WINDSHIELD WIPER

Application filed August 31, 1928. Serial No. 303,344.

The present invention relates to wipers, intended for wiping and cleaning glass surfaces, and is particularly adapted for use as a windshield wiper, to remove from windshields any moisture, snow, or other coatings in order that the occupants of a vehicle may have a clear and uninterrupted vision through said windshield.

The invention also relates to a novel method of manufacturing my novel windshield wipers.

An important object of the present invention is the provision of a windshield wiper wherein all exposed or external surfaces are of rubber. This is an important advantage and feature, as it eliminates all rusting or other objectionable disadvantages which are present in usual windshield wipers wherein the wiping blades or elements are carried in a metallic frame or clip. It presents other advantages, such as the fact that the wiper cannot cause any injury, such as scratching or marring, to the glass surface on which it is operating, or to any adjacent painted, varnished or enameled surfaces of the frame of the windshield or vehicle.

Another object of the invention consists in providing a plurality of wiping blades, strips, prongs, or the like, preferably integral, each of which is normally out of contact with adjacent blades or prongs. This is important since, regardless of the pressure of the wiping blades or edges on the glass surface being cleaned, there will always remain channels extending longitudinally of the wiper, through which channels moisture may flow and escape from the lower end of the wiper.

A further feature of the invention resides in providing, at each side of the wiper, a wiping edge extending at an angle from the adjacent wiping edge.

This last described construction permits said angularly disposed wiping edge to function as a scraper, breaking up globules of rain which collect on the surface being cleaned, and also to break up snow or other congealed matter, after which breaking up the normal wiping edges will more easily remove the same. These angularly disposed wiping edges or strips serve the further function of reinforcing the normal wiping edges, and also of preventing too-great flexing thereof, particularly the central edge, which is of greater height than the other edges, thus enabling said normal wiping edges to exert greater pressure against the surface to be cleaned, resulting in a more efficient and more positive cleaning action.

Another object of the invention resides in the fact that my entire wiper is molded into one homogeneous structure, thus resulting in a much stronger, longer lasting, and less destructible device.

A still further feature of the present invention consists in the fact that a reinforcing strip of metal or other suitable material is embedded and concealed within the molded rubber wiper, this reinforcing strip strengthening the wiper and holding the body portion thereof rigid throughout its length.

In carrying out my present novel method of manufacturing this novel windshield wiper, I utilize a substantially flat strip of suitable material, preferably metal, provided with an aperture adjacent to each end thereof. These apertures enable the strip to be properly centered in suitable mold sections. I also provide, throughout the length of said metal strip, a plurality of apertures through which the rubber will flow and solidify around and through said reinforcing strip, resulting in a unitary rugged structure.

Centrally of said reinforcing strip, is an aperture by means of which the wiper may be attached to a clip carried by an arm which may be driven from a motor or any suitable source of power.

I believe that my windshield wiper, as above described, is novel, and have therefore claimed the same broadly in the present application.

I also believe that the method of manufacturing said wiper, above briefly described, is novel, and have therefore claimed said process in this application.

The above and other objects of the invention, details of construction, combinations and advantages, will be hereinafter more fully pointed out, described and claimed.

Referring to the drawings, illustrating a preferred embodiment of my present invention, Fig. 1 is a side elevation of my completed novel windshield wiper ready for operation;

Fig. 2 is a side elevation of the reinforcing strip;

Fig. 3 is a cross-sectional view on the line 3—3 of Fig. 1;

Fig. 4 is a cross-sectional view illustrating my novel wiper in preferred operating position;

Fig. 5 is a cross-sectional view illustrating the wiper under greater pressure than illustrated in Fig. 4;

Fig. 6 is a cross-sectional view illustrating the wiper under a light tension and operating in one direction;

Fig. 7 is a cross-sectional view similar to Fig. 6 with the wiper operating or being moved in the opposite direction; and Fig. 8 is a cross-sectional view illustrating the wiper constructed without the longitudinal angularly disposed reinforcing wiping edges.

Referring now to the drawings, for a particular description of my invention, 1 designates a strip of suitable material, preferably steel or other metal, having therein adjacent to each end an aperture 2, said apertures being for the purpose of enabling the strip to be centered upon pins in a suitable mold. Throughout the length of the strip 1 are also a plurality of apertures 3, any desired number of these apertures being provided. The strip 1 is then surrounded, in a mold, with suitable rubber in such manner as to form a body portion 4, the rubber flowing through the apertures 3, as illustrated at 5, and firmly uniting the body portion around the strip 1, which is embedded and concealed within said body portion.

Depending from said body portion, and integral therewith, are a plurality of blades or wiping edges 6 and 7, the central edge 6 being of greater height than the edges 7. When in normal position each of these edges 6 and 7 is out of contact with the adjacent edges, with channels 15 therebetween. Regardless of the pressure which is exerted on these edges 6 and 7 during operation, these channels 15 will always remain open, affording a clear passage throughout the length of the wiper for moisture to travel, thus relieving the amount of moisture which the wiper must remove or clean from the surface being cleaned, here illustrated as a glass wiper 13. Formed integral with each outer edge 7, on the outside thereof, at a predetermined distance above the bottoms thereof, and extending substantially the full length thereof, is a rib 8, each of said ribs also having a wiping corner or edge 14 thereon.

These ribs 8 perform a very useful function during the operation of my novel wiper, in that they reinforce all the wiping edges, and cause the same to exert greater pressure on the surface being cleaned than would be otherwise possible.

Furthermore, as illustrated in Fig. 4, when the central wiping edge 6 and one outer edge 7 are engaging the surface 13, the edge 14 of the rib 8 will be spaced slightly from the surface 13. When in this position, and during the travel or oscillation of the wiper upon the surface 13, the edge 14 will break up globules of rain or moisture, or flakes of snow, or the like, which will have gathered on the surface 13 between oscillations of the wiper, and will thus enable the edges 6 and 7 to more easily remove the remaining moisture or substance from the surface 13.

If extremely heavy weather conditions are encountered, the pressure on the wiper may be increased, by varying the angle of the arm 12 relatively with the surface 13, until the wiper is brought into the position illustrated in Fig. 5, whereupon three wiping edges will be operating upon the surface 13, at all times, the pressure of said edges being increased by the resistance of the rib 8 which is not in contact with the surface 13.

If only light moisture is to be removed from the glass surface 13, the wiper may be set to the position illustrated in Figs. 6 and 7, where only the central edge 6 will be in engagement or contact with the surface 13. As the wiper oscillates back and forth on the surface 13, the edge 6 will alternately come into contact with the outer edges 7, and due thereto, and also to the presence of the ribs 8 on the edges 7, sufficient pressure will be exerted upon the central edge 6 and by the central edge 6 upon the surface 13, to efficiently clean and wipe the same.

If desired, my novel wiper may be molded or formed without the reinforcing and strengthening ribs 8, whereupon the structure similar to that illustrated in Fig. 8 will be produced. This structure, under normal circumstances, will be found very satisfactory and efficient, but for heavier weather and moisture conditions, the form illustrated in Fig. 3 is preferable.

The reinforcing strip 1 is also provided with a central aperture 9, through which a screw 10 may attach the wiper to a clip 11 carried by the arm 12.

The advantages, benefits, utility and desirability of my novel wiper will instantly appeal to those skilled in the art, as well as to the users of same.

While I have necessarily described my present invention somewhat in detail, it will be appreciated that I may vary the size, shape and arrangement of parts within reasonably wide limits without departing from the spirit of the invention.

My invention is further described and defined in the form of claims as follows:

1. A molded rubber wiper comprising a body portion, a plurality of wiping strips integral with said body portion, the outside surfaces of said wiping strips being substantially flush with the outer surfaces of said body portion, and a reinforcing and stiffening strip or rib of rubber integral with each said outside surface of said strips, each of said ribs having a wiping edge angularly disposed with relation to said outside surfaces of said strips.

2. A molded rubber wiper comprising a body portion, a reinforcing member within said body portion, a plurality of outer wiping strips integral with said body portion, a reinforcing and stiffening rib of rubber integral with each outer wiping strip, each of said ribs having a wiping edge angularly disposed with relation to said outer wiping strips, and a central wiping strip integral with said body portion and normally out of engagement with said outer strips.

3. A molded rubber wiper comprising a body portion, a reinforcing strip within said body portion having a plurality of apertures by means of which the rubber will be firmly united with said reinforcing strip, a plurality of outer wiping strips integral with said body portion, a reinforcing and stiffening rib of rubber integral with each outer wiping strip, each of said strips having a wiping edge angularly disposed with relation to said outer wiping strips, and a central wiping strip integral with said body portion and normally out of engagement with said outer wiping strips, said central strip being of greater height than said outer strip.

In testimony whereof, I have signed my name to this specification.

WILLIAM STORRIE.